US012554648B2

(12) United States Patent
Brewer et al.

(10) Patent No.: US 12,554,648 B2
(45) Date of Patent: *Feb. 17, 2026

(54) EVICTING A CACHE LINE WITH PENDING CONTROL REQUEST

(71) Applicant: Micron Technology, Inc., Boise, ID (US)

(72) Inventors: Tony M. Brewer, Plano, TX (US); Dean E. Walker, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,235

(22) Filed: Jun. 12, 2024

(65) Prior Publication Data

US 2024/0330194 A1 Oct. 3, 2024

Related U.S. Application Data

(63) Continuation of application No. 17/823,307, filed on Aug. 30, 2022, now Pat. No. 12,013,788.

(51) Int. Cl.
*G06F 12/08* (2016.01)
*G06F 12/0891* (2016.01)

(52) U.S. Cl.
CPC ...... *G06F 12/0891* (2013.01); *G06F 2212/60* (2013.01)

(58) Field of Classification Search
CPC ........................ G06F 12/0891; G06F 2212/60
See application file for complete search history.

(56) References Cited

U.S. PATENT DOCUMENTS

| | | | |
|---|---|---|---|
| 2017/0185515 A1* | 6/2017 | Fahim | G06F 12/0815 |
| 2019/0089785 A1 | 3/2019 | Dotzler et al. | |
| 2020/0371960 A1* | 11/2020 | Bhoria | G11C 29/52 |
| 2021/0374056 A1 | 12/2021 | Malladi et al. | |
| 2021/0374080 A1* | 12/2021 | Horwich | G06F 12/0891 |
| 2022/0012175 A1* | 1/2022 | Ishii | G06F 12/126 |
| 2024/0070082 A1 | 2/2024 | Brewer et al. | |

FOREIGN PATENT DOCUMENTS

CN 117632791 A 3/2024

* cited by examiner

*Primary Examiner* — Masud K Khan
(74) *Attorney, Agent, or Firm* — Schwegman Lundberg & Woessner, P.A.

(57) ABSTRACT

System and techniques for evicting a cache line with pending control request are described herein. A memory request—that includes an address corresponding to a set of cache lines—can be received. A determination can be made that a cache line of the set of cache lines will be evicted to process the memory request. Another determination can be made that a control request has been made to a host from the memory device and that the control request pending when it is determined that the cache line will be evicted. Here, a counter corresponding to the set of cache lines can be incremented (e.g., by one) to track the pending control request in face of eviction. Then, the cache line can be evicted.

20 Claims, 9 Drawing Sheets

| | | | |
|---|---|---|---|
| 405 | CACHE SET 0 (ADDRESS 00XXXX) | CACHE LINE | WAY 0 TAG + DATA — 425 |
| | | CACHE LINE | WAY 1 TAG + DATA — 430 |
| | | CACHE LINE | WAY 2 TAG + DATA — 435 |
| | | CACHE LINE | WAY 3 TAG + DATA — 440 |
| 410 | CACHE SET 1 (ADDRESS 01XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 415 | CACHE SET 2 (ADDRESS 10XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 420 | CACHE SET 3 (ADDRESS 11XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |

FIG. 4

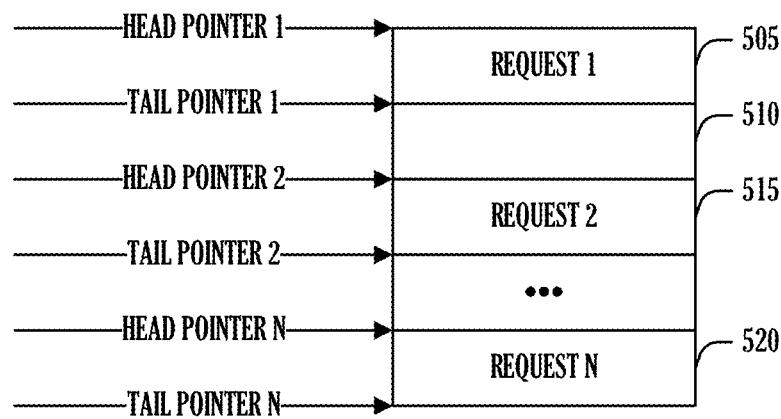
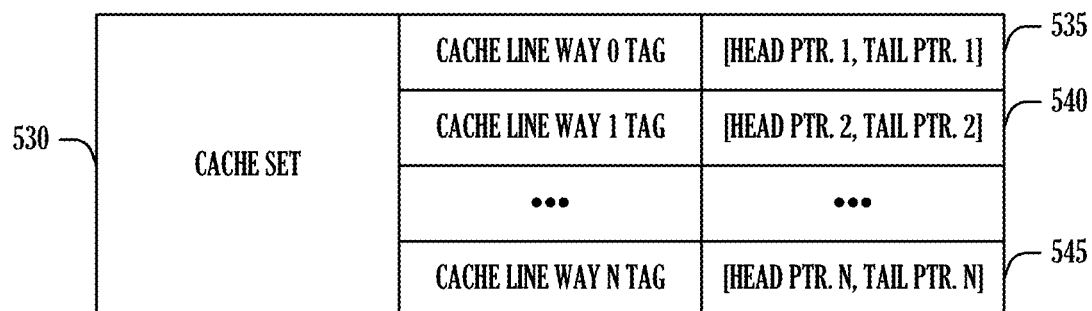
FIG. 5

EVICTING A CACHE LINE WITH PENDING CONTROL REQUEST

PRIORITY APPLICATION

This application is a continuation of U.S. application Ser. No. 17/823,307, filed Aug. 30, 2022, which is incorporated herein by reference in its entirety.

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to evicting a cache line with pending control request.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates an example of an associative cache, according to an embodiment.

FIG. 5 illustrates an example of a memory including several cache way defer queues and cache tags pointing to the defer queues, according to an embodiment.

DETAILED DESCRIPTION

Figure 1:
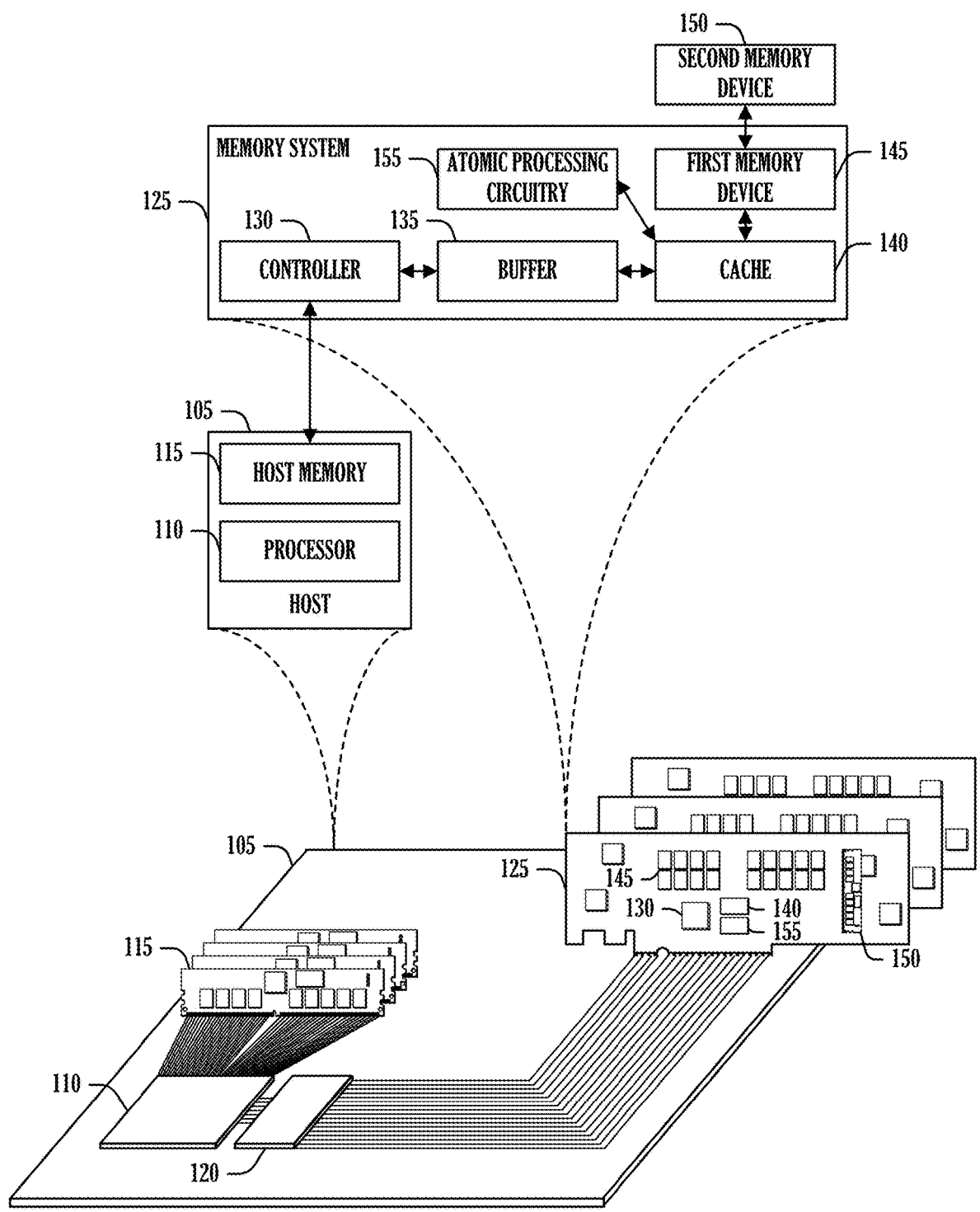
FIG. 1 illustrates an example of an environment including a system for evicting a cache line with pending control request, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. In accordance with current CXL standards, CLX memory requests (e.g., external requests) take priority over other requests, such as network-on-chip (NOC) or other internal requests. This priority requires CXL memory requests to make forward progress independent of any other device activity, such as activity by an accelerator. That is, a CXL memory request cannot block indefinitely waiting for a non-CXL memory request to complete. Separately managing memory controller workflow with this restriction when both CXL and non-CXL requests are being made can be a complex process.

To address the complexity between CXL (or other external) requests and accelerator (or other internal requests), separate processing queues are maintained for deferred requests. Requests that are not deferred proceed as soon as they arrive in the memory controller because there is no resource contention. Thus, in these cases, there is no opportunity, for example, for an internal request to block the progress of an external request. However, when resource contention is present, the request will be deferred until the contention is resolved. An elegant solution to managing the different processing priorities of external and internal requests includes queuing each in separate deferral queues, whereby priority of the external requests can be easily maintained by prioritizing extraction of requests from the external queue. Moreover, order of operations on a memory address can be maintained by judicious selection of requests from the external and internal queues all while preventing an internal request from blocking (e.g., preventing forward progress on) an external request.

CXL coherency mechanisms provide control semantics for cache elements in CXL and host devices. An issue that can arise involves the time it can take to request control of a cache line from a host in a CXL device and when control is granted by the host to the CXL device. For example, a memory address managed by the CXL device can be reflected in a cache way of the CXL memory device as well as a cache way of a host processor. To modify the cache way by the CXL device, control of the cache way is requested from the host processor to enable the host processor to perform cache maintenance on the cache managed by the host processor. This procedure can be called a "recall" of the cache line, such that control of the cache line is recalled to the CXL device. The term "bias flip" also references this procedure as bias flips from the host to the CXL device upon a successful completion of the procedure. In an example, the host signifies the exchange of control for the cache line in CXL meta state of the CLX interface.

When an internal request specifies a memory line that is not associated with a current way, a way is evicted. However, if during the recall to evict the way, an external request arrives, the line may be evicted immediately as it is assumed that the host making the external request has already addressed coherency issues in the cache. Accordingly, a way can be designated for eviction to enable a CXL.mem (e.g., external memory) request to make forward progress. If, in a cache set (e.g., a set of cache lines or ways), all ways are being recalled from the host, then a way with a pending recall must be evicted to ensure forward progress. The external request can complete before the pending recall completes. Then, if a new internal request that matches the same address is received while the line is waiting the pending recall, a system unaware of the pending recall may process the new request. In this case, the order of request processing cannot be guaranteed.

To address the order of request processing given the above scenario, a counter associated with each cache set is maintained to track pending recalls. The counter indicates the number of ways evicted that were in a pending recall state. If the counter is greater than zero, then new internal requests are added to the cache set internal queue. Also, the cache set internal queue is not processed (e.g., no new requests are popped) while the counter is greater than zero. This ensures in-order processing of requests for a memory line in the presence of evicted pending recall states. Additional details and examples are provided below.

FIG. 1 illustrates an example of an environment including a system for evicting a cache line with pending control request, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM)

devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

The following configuration is described from the perspective of the controller 130 for the sake of simplicity. However, the cache 140 can include circuitry to perform some or all of these operations. The complexities of evicting a cache line when there is a pending recall request are addressed by the controller 130 maintaining and respecting a counter for cache sets. Again, the complexity of pending recall requests can involve receipt of a non-prioritized request (e.g., an internal request) when the way was evicted. Generally, there is no recall request, or bias flip, required when the way is evicted due to the prioritized request because the prioritized request originates from the entity (e.g., the host processor 110) from which the recall is requested. Accordingly, a recall request usually occurs when an internal request provokes a way to be evicted. If the way is evicted (e.g., due to necessity from an external request), then internal requests can be stored in cache way queues for the evicted way. However, during the pendency of the recall request, the state of the way is in flux and pushing a new internal request onto the cache way queue can result in out-of-order execution. Accordingly, in this circumstance, the controller 130 is configured to push the new internal request to the cache set queue. The existence of this instance is marked by the counter in the cache set. Whenever the recall request is made, the counter is incremented. Thus, if recall requests are made on three ways of the cache set, the counter has a value of three. As the recall requests are completed, the counter is decremented. Only when the counter is zero can a new internal request but added to a cache way queue.

To implement the above, the controller 130 is configured to receive an external request (e.g., a memory request is received on the external interface of the memory system 125). The external request specifies an address specific to a cache set but not a current way of the cache set. Thus, the external request will provoke an eviction to a current way of the cache set. Accordingly, the controller 130 is configured to determine, based on the circumstances of the external request and the state of the cache set, that the cache way will be evicted to process the external request. The controller 130 is also configured to determine that a control request (e.g., recall request or bias flip request) has been made, for example, to the host processor 110. In an example, the controller 130 is configured to recognize that the control request is pending (e.g., not yet completed) when the determination is made that the cache way will be evicted.

In an example, a response to the control request is received, for example, from the host processor 110. In this example, the response indicates that the cache way is under the control of the memory system 125. In an example, the response is a CXL meta state that designates the memory system 125 to be in control of memory lines that include the cache way. In an example, the CXL meta state specifically indicates that the cache way is under the control of the memory system 125.

The controller 130 is configured to decrement the counter of the cache set by one for each received response to a control request. Processing of internal memory requests can resume, for example, on the cache way by the controller 130 when the counter reaches zero. Generally, as long as there is a pending recall request, the internal requests will not be added to a cache way queue or extracted from the cache set queue.

As noted above, the controller 130 is configured to increment the counter by one when the cache way has been, or will be evicted, and a control request has been made. In an example, the counter has a maximum value equal to a cardinality of the set of cache lines. Thus, the counter cannot be greater than the number of ways in the cache set. This condition is sensible because there generally could not be more pending recalls than ways.

The controller 130 is configured to evict the cache way. Accordingly, once the housekeeping of incrementing the counter is complete, the way can be evicted without further record keeping. Thus, for this technique to operate, there is no requirement that a record of which specific way is evicted is tracked. Merely that there is some way for which a pending control request is outstanding. This simplifies the hardware needed to track this condition.

The following examples consider the controller 130 configuration that leads to the making of the control request. Thus, in an example, the controller 130 is configured to receive an internal memory request, for example on an internal interface of the memory system 125. In this example, the internal memory request includes an address corresponding to a cache way that is under control of the host processor 110 when the internal memory request is received. The internal memory request is pushed onto the cache way queue (e.g., the cache way internal queue) of pending internal memory requests corresponding to the cache way. The control request can then be transmitted to the host processor 110 to gain control of the cache way from the host processor 110.

With respect to evicting the cache way, the controller is configured to copy tag data for the cache way into request information memory corresponding to the address. This example uses a request information repository, such as the CM request information table 305, NI request information table 315, or NI+CM request information table 330 illustrated in FIG. 3. In an example, this information is written to the backing memory (e.g., the first memory device 145 or the second memory device 150) when the cache way is evicted. In an example, the tag data includes a pointer to the queue of pending internal memory requests corresponding to the cache line. This example is similar to the arrangement illustrated in FIG. 5 or in FIG. 6.

In an example, the controller 130 is configured to receive a second internal request (e.g., another memory request on an internal interface of the memory system 125). In this example, the second internal request matches the cache set. The controller 130 is configured to read the counter of the cache set to determine that the counter is greater than zero. If the counter is greater than zero, the controller 130 is configured to push the second internal request onto the cache set queue (e.g., cache set internal queue), which is a deferred queue for the cache set.

Once the control requests have completed, and the counter is back to zero, the controller 130 processes the queues of the cache set and the cache ways as it would normally process these queues. Thus, generally, the controller is configured to drain the external queues of the current cache ways, then the internal queues of the cache ways, and then drain the queues of the cache set to load new ways and clear the deferred quests of the cache set.

Figure 2:
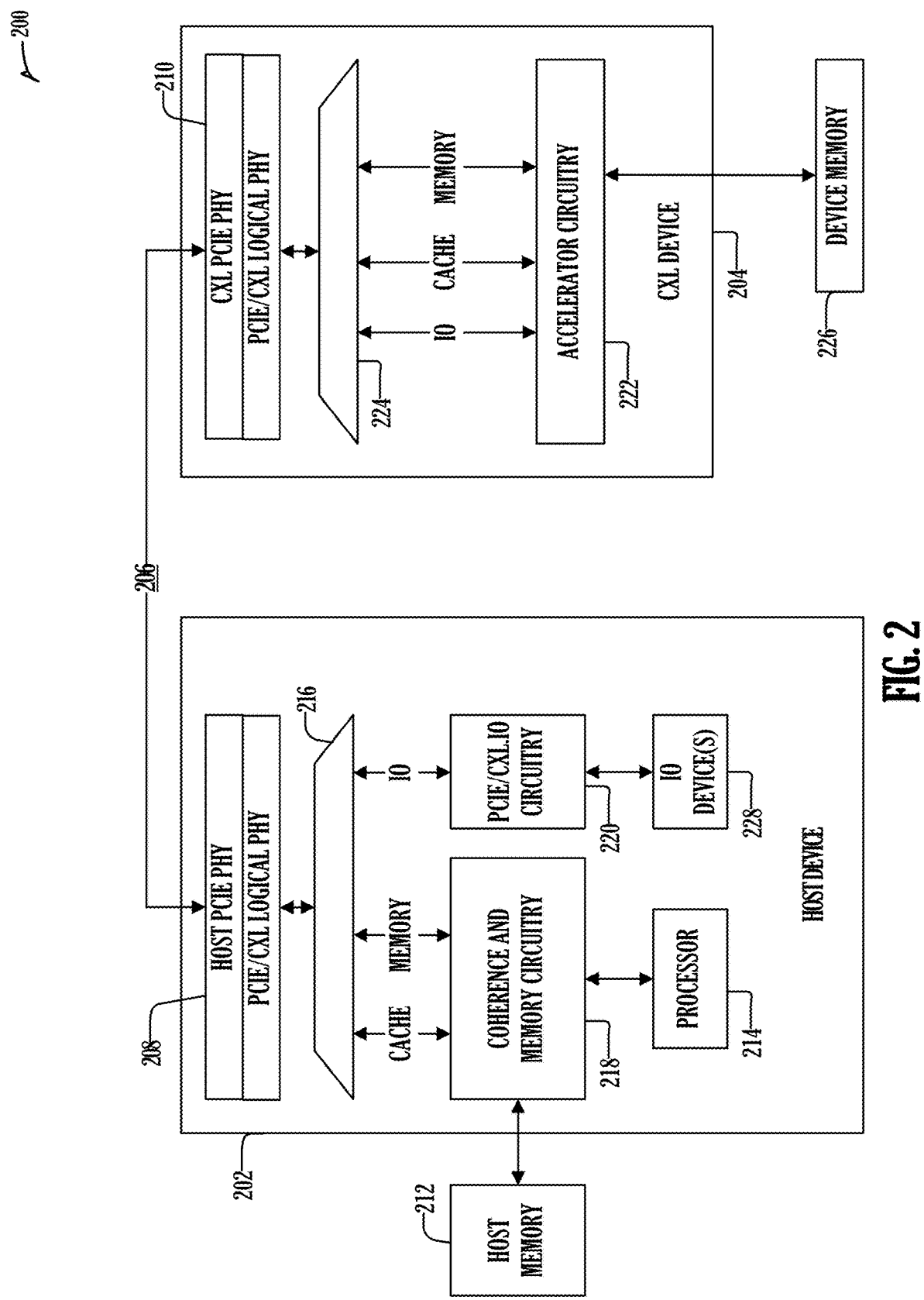
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL-.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL-.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

Figure 3:
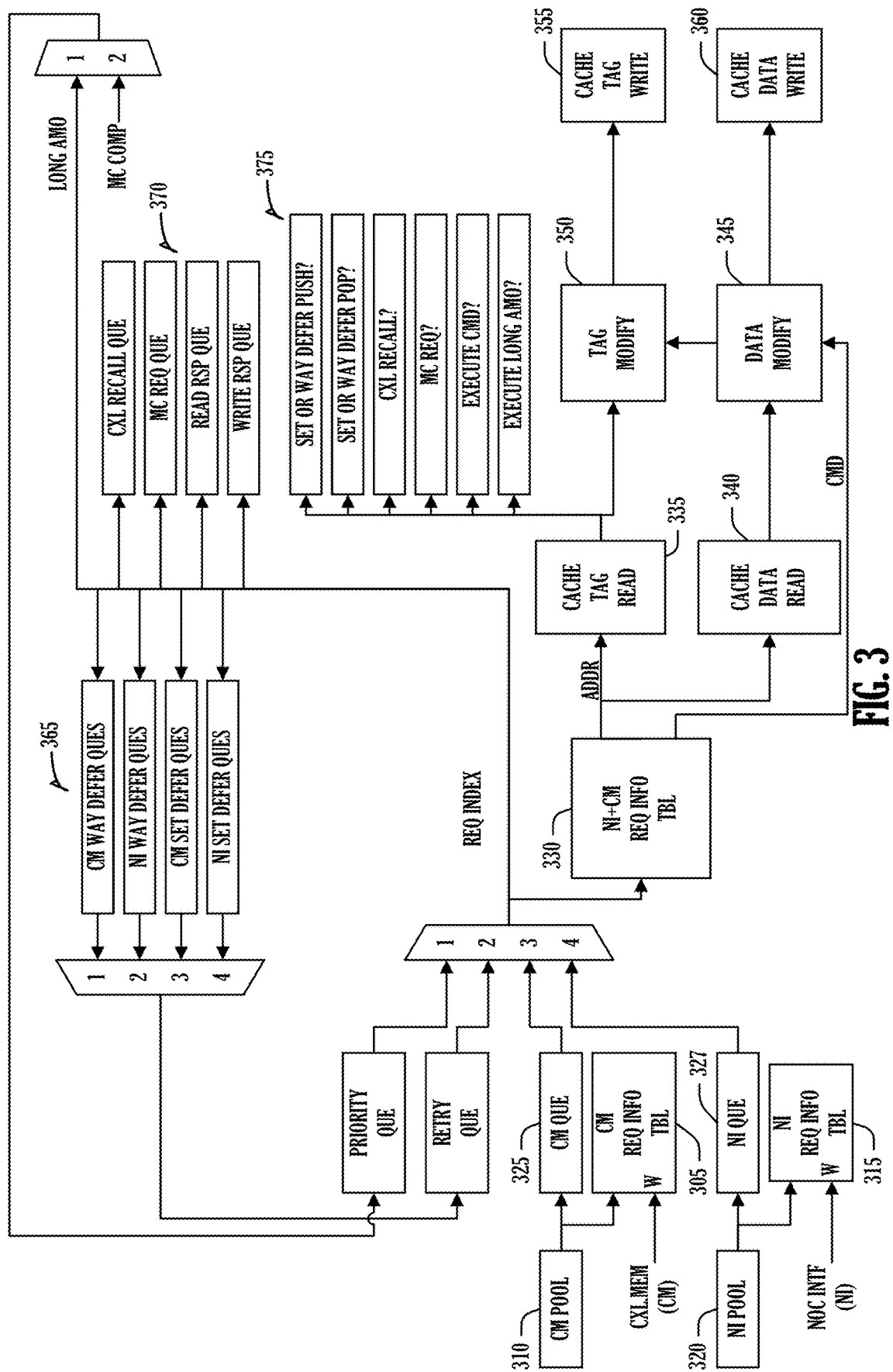
FIG. 3 illustrates example components of a memory device, according to an embodiment.

FIG. 3 illustrates example components of a memory device, according to an embodiment. The illustrated components are part of a memory controller, such as those described above (e.g., the memory controller 130 illustrated in FIG. 1) implementing a memory-side cache (MSC).The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools—the CM Request Information Table Pool 310 and the NI Request Information Table Pool 320—are configured such that accelerator requests (e.g., internal requests) cannot consume all table entries. Thus, for example, if an additional NI request arrives and there is no free entry indicated in the NI Request Information Table Pool 320, the request fails.

CXL.mem requests from the CM queue 325 are selected at higher priority than NI requests in the NI queue 327 to ensure forward progress of the CM requests. In an example, as illustrated, when a request is selected from either the CM queue 325 or the NI queue 327, the request information is written into the NI+CM Request Information Table 325. Hereafter, each request is represented in the carious queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one 410 corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool              m_bRetryPend;
    uint32_t          m_evHashMask;
    SimCount          m_evRecallCnt;
    SimMscReqList     m_niDeferList;
    SimMscReqList     m_cmDeferList;
};
```

The following is an example of a data structure (e.g., C-style struct) to hold tag data for a given way in a cache set:

```
struct MscWay {
    struct MscWayTag {
        uint64_t         m_addr;
        std::bitset      m_validMask;
        std::bitset      m_dirtyMask;
        std::bitset      m_mBusyMask;
        bool             m_bRetryPend;
        bool             m_bRecallPend;
        uint16_t         m_recallRid;
        MetaState        m_memMetaState;
        MetaState        m_curMetaState;
        SimMscReqList    m_niDeferList;
        SimMscReqList    m_cmDeferList;
    } m_tag;
    uint8_t              m_data;
};
```

FIG. 5 illustrates an example of a memory 500 including several cache way defer queues and cache tags 525 pointing to the defer queues, according to an embodiment. As illustrated, the memory 500 is used to implement several queues. The queues each occupy a contiguous range of the memory 500, with the specific boundaries of the queue defined by a head a tail pointer. In this example, the queue is implemented as a linked list or a double-linked list. The former enables traversal starting at the head, although enqueueing can be accomplished merely by updating the tail element with a new tail location and placing the new item at the new tail location. A double linked list enables traversal of the list from either the head or the tail.

The queues correspond to a cache way by storage of the head and tail pointers in the tag data. Thus, in the cache set 530, the way zero tag 535 maintains the head and tail pointer for the queue 505 (illustrated as holding request one). The empty entry 510 is part of the contiguous memory range corresponding to the queue 505. Thus, if a second request were enqueue, the tail pointer would be moved to the entry 510. Similarly, the way one tag 540 holds the head and tail pointer for the queue 515, and the way N tag 545 maintains the head and tail pointer for the queue 520.

An alternative configuration of the queue can leverage, if it exists, the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

Figure 6:
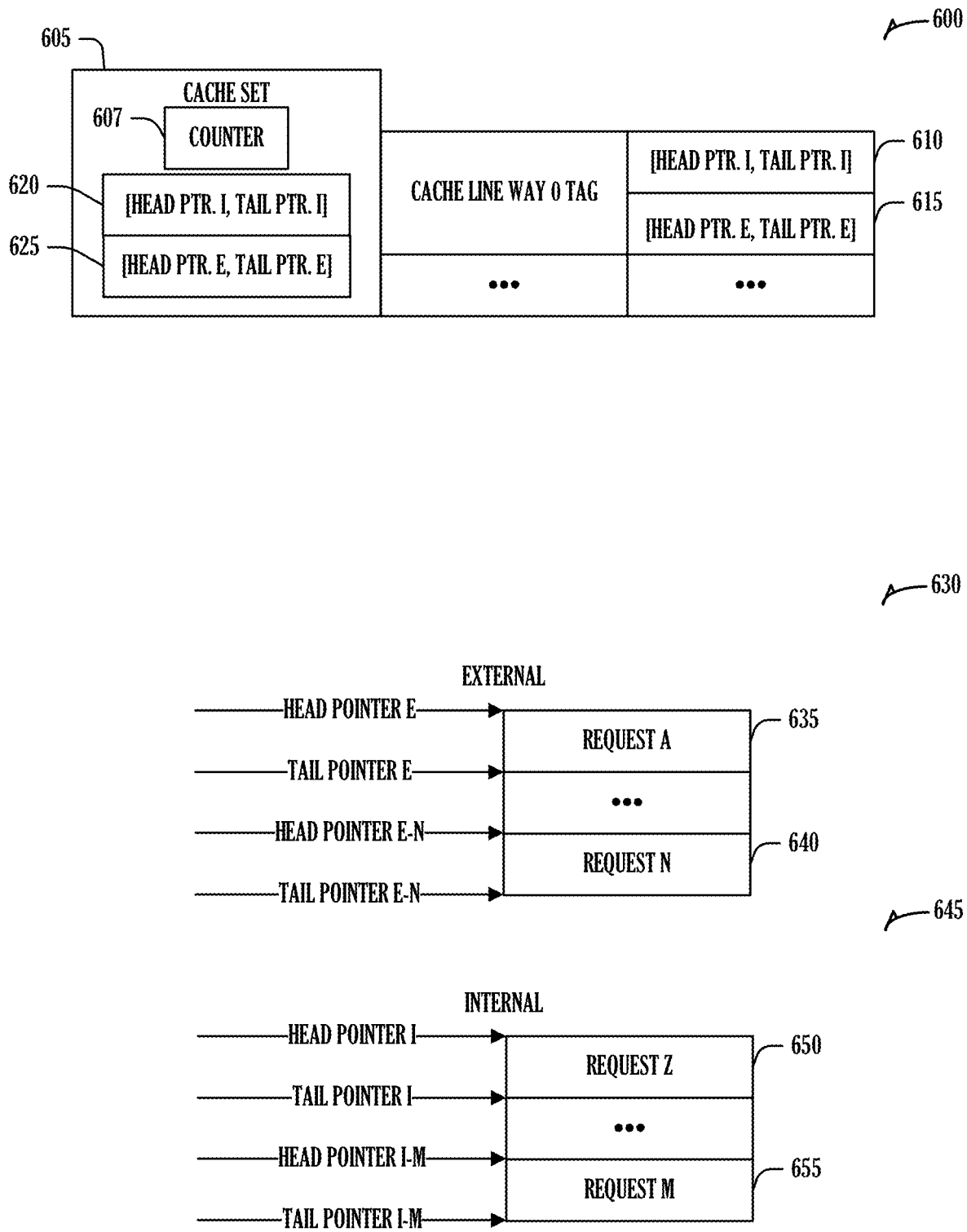
FIG. 6 illustrates an example of a cache set reference to cache-set defer queues divided by which interface requests were received, according to an embodiment.

FIG. 6 illustrates an example of a cache set reference 600 to cache-set defer queues divided by which interface requests were received, according to an embodiment. Specifically, the external defer queues 630 hold requests, or identifiers of requests, for CM requests and the internal defer queues 645 hold NI requests. FIG. 6 differs from the arrangement illustrated in FIG. 5 by separating the queues between the external queues 630 and the internal queues 645. Thus, the way zero tag data includes a field 610 storing the head and pointer for external queue 635 as well as the field 615 for the head pointer of the internal queue 650.

Another difference from the arrangement illustrated in FIG. 5 includes the inclusion of the field 620, the field 625, and the counter 607 in the cache set 605. Here, the field 620 holds a head and tail pointer for an external queue of the cache set 605 and the field 625 holds a head and tail pointer for an internal queue of the cache set 605. If a way is instantiated for an address in the request, but the way is busy, the request is deferred into the appropriate defer queue for the way. Thus, if the request A is an external request and has an address that corresponds to the current way zero, but way zero is busy, then request A is enqueued into the queue 635 for the way zero. However, if there is no way that corresponds to the address in the request, then the request is deferred at the cache set level. Accordingly, because request M is an internal request with an address that does not match any current way—and all ways are busy—the request M is deferred by being placed on the internal defer queue 655. Similarly, external request N is deferred at the cache set level in queue 640 for similarly reasons given for request M.

The counter 607 tracks the number of pending recall operations. Thus, as a recall is requested by the memory device, the counter is incremented. As the recall is returned (e.g., via a CXL meta state change to the way or to the cache set), the counter is decremented. The counter is used to defer internal requests while there are any pending recalls. Thus, if the way is evicted but the counter is not zero, all new internal requests will be stored in the internal defer queue 645 for the cache set 605 as controlled by the field 620.

Figure 7:
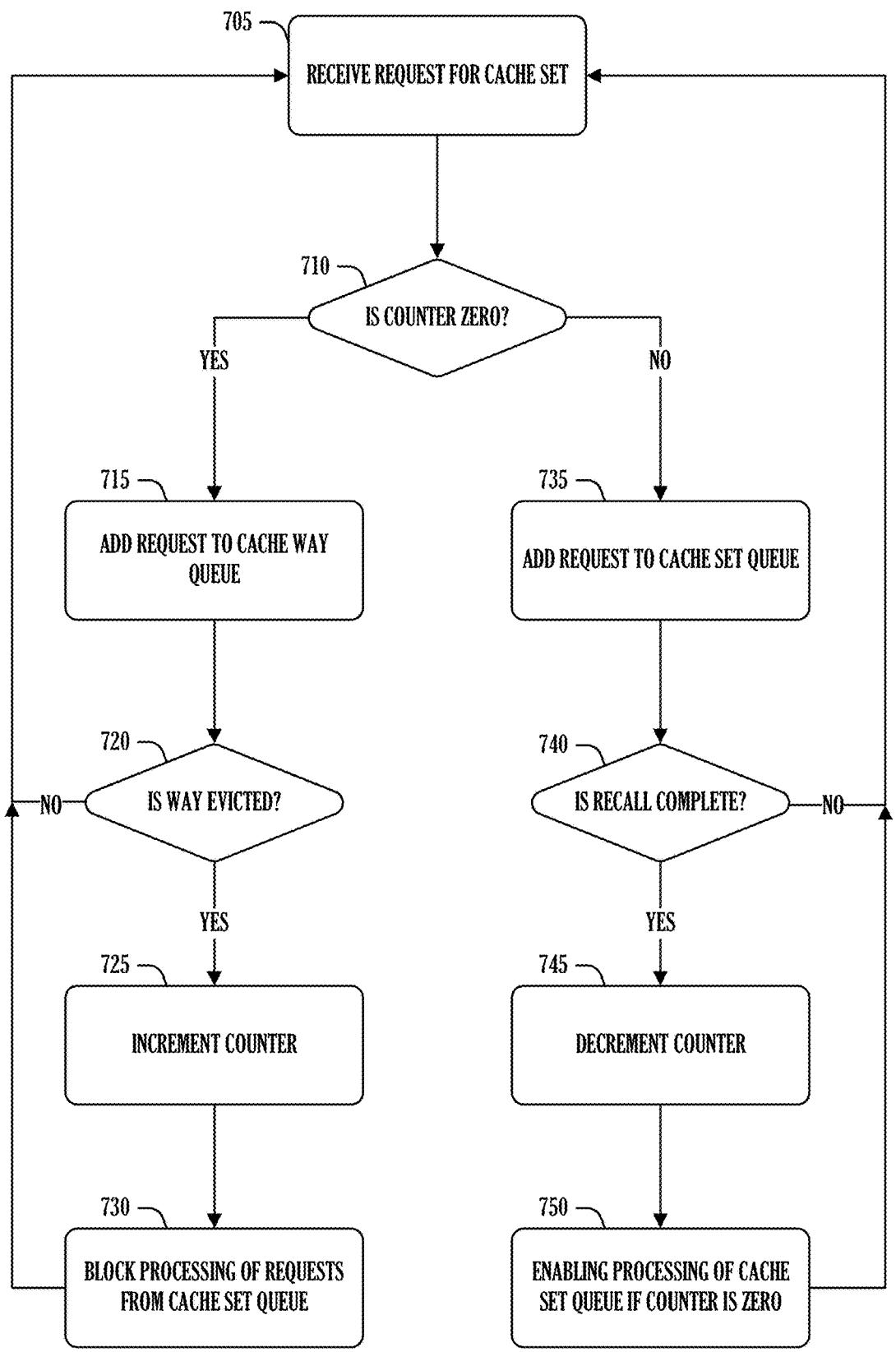
FIG. 7 illustrates an example of a processing flow for evicting a cache line, according to an embodiment.

FIG. 7 illustrates an example of a processing flow to synchronize requests, according to an embodiment. In general, when an internal request is received and there is no current way that corresponds to the address in the internal request, some pending way will be evicted to load the memory line for the address. If all of the ways have been servicing external requests, then a recall request will be made to the host in order to ensure that the way is in a consistent state before being written back to the memory, or otherwise evicted. Because the recall can take some time, the internal request can wait while an external request comes in. Now, in the case of a CXL memory external request, eviction cannot wait because waiting for the recall will result in blocking, or a lack or forward progress, for the external request. The pending recalls and cache way queues are stored. For example, the evicted way tag state is stored in the request info table associated with the recalled way and the way along with the tag state are written to the backing memory. In an example, the cache set associated with the recalled way is marked indicating a recalled line was evicted. The marking can take the form of a counter, where each pending recall increments the counter and returned recalls decrement the counter. Accordingly, the counter can be called the evicted recalled line counter. If the counter is greater than zero, there is currently at least one evicted recalled way associated with the cache set. In this case, future internal requests are pushed to the cache set queue.

When the recall is completed with an evicted way, the evicted way is read from memory and the tag state, and the data is restored in the cache. In an example, the tag state is restored from the request information table. Once the way is restored, the evicted recalled line counter is decremented, for example, back to zero—enabling requests in the cache set internal queue to be popped—and enabling the internal request that originally caused the host recall to be completed.

Following the above in the illustrated process, the internal request is received (operation 705) and a determination is made as to whether the evicted line recall counter for the cache set is zero (decision 710). If yes, the request is added to the cache way queue (operation 715) assuming that the cache way queue is not empty, or the cache way is busy. If the way is not evicted before the request is popped (decision 720), the request is performed. If the way is evicted before the request is popped from the cache way queue, then the evicted recalled line counter is incremented (operation 725) and no further processing of the cache set internal queue occurs (operation 730).

If the evicted recalled line counter was not zero (decision 710), then the internal request is added to the cache set internal queue (operation 735). When the recall is complete (decision 740), the counter is decremented (operation 745) and processing of the cache set internal queue can continue if the counter is at zero (operation 750).

Figure 8:
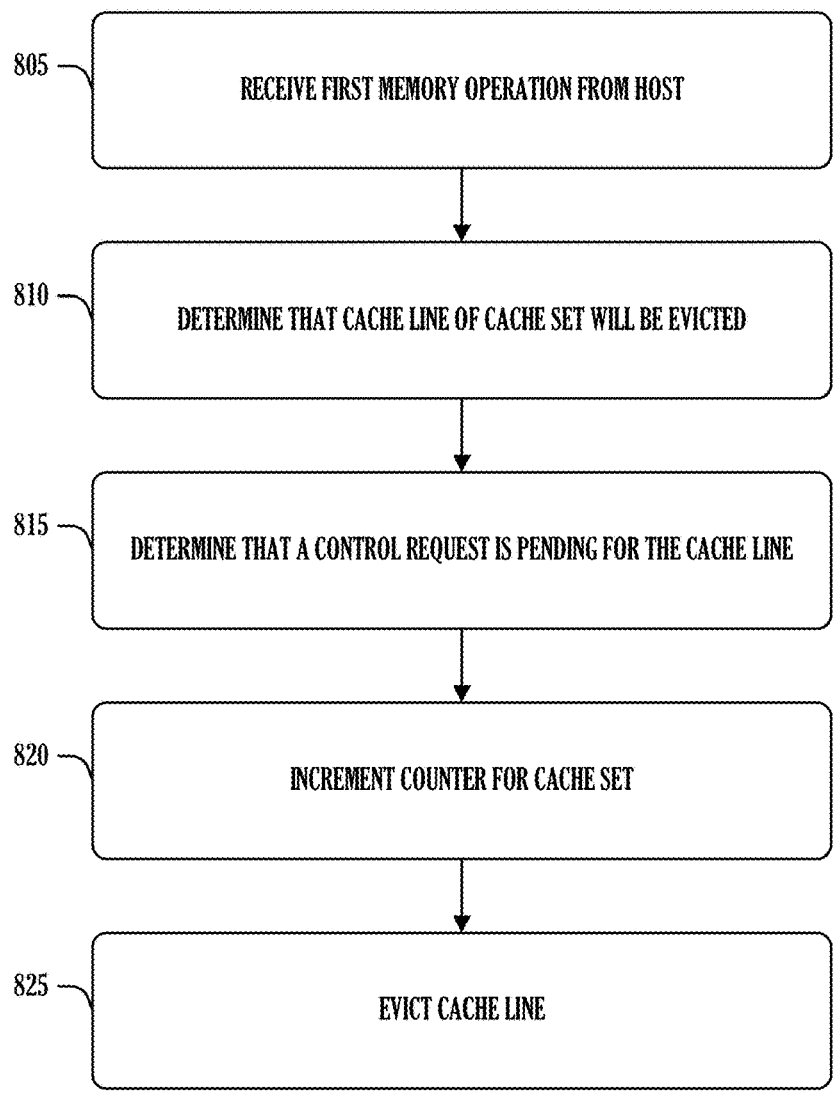
FIG. 8 illustrates a flow diagram of an example of a method for evicting a cache line with pending control request, according to an embodiment.

FIG. 8 illustrates a flow diagram of an example of a method 800 for evicting a cache line with pending control request, according to an embodiment. The operations of the method 800 are performed by computational hardware, such as that described above or below (e.g., processing circuitry).

At operation 805, a memory request is received on an external interface of a memory device. In an example, the memory request includes an address corresponding to a set of cache lines.

At operation 810, it is determined that a cache line of the set of cache lines will be evicted to process the memory request.

At operation 815, it is determined that a control request has been made to a host from the memory device. Here, the control request is pending when the determination is made that the cache line will be evicted.

In an example, a response to the control request is received from the host. In this example, the response indicates that the cache line is under the control of the memory device. Processing of internal memory requests can then resume on the cache line and the counter is decremented by one.

At operation 820, a counter corresponding to the set of cache lines is incremented by one. In an example, the counter has a maximum value equal to a cardinality of the set of cache lines.

At operation 825, the cache line is evicted. In an example, the method 800 includes receiving an internal memory request on an internal interface of the memory device. In this example, the internal memory request includes an address corresponding to a cache line that is under control of the host when the internal memory request is received. The internal memory request is pushed onto a queue of pending internal memory requests corresponding to the cache line. The control request can then be transmitted to the host to gain control of the cache line from the host. In an example, evicting the cache line includes copying tag data for the cache line into request information memory corresponding to the address. In an example, the tag data includes a pointer to the queue of pending internal memory requests corresponding to the cache line.

In an example, the method 800 can receive a second memory request on an internal interface of the memory device. In this example, the second memory request includes a second address corresponding to the set of cache lines. The counter can be read to determine that the counter is greater than zero and, in response to the counter being greater than zero, the second memory request is pushed on a deferred queue for the set of cache lines. In an example, the deferred queue corresponds to the internal interface of the memory device.

Figure 9:
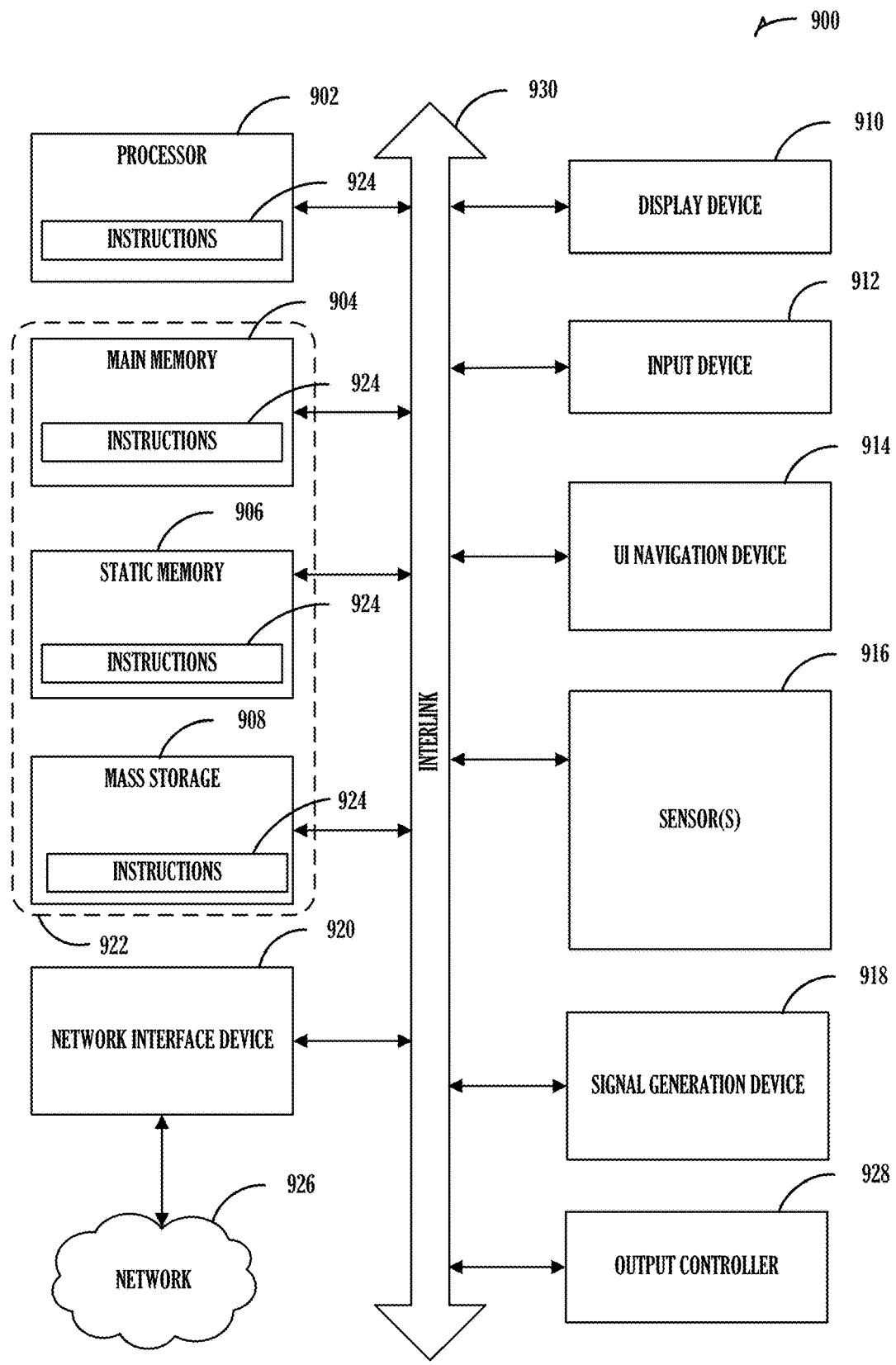
FIG. 9 illustrates an example of a machine with which one or more embodiments can be implemented.

FIG. 9 illustrates a block diagram of an example machine 900 with which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drives, tape drives, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 922 can be representative of the instructions 924, such as instructions 924 themselves or a format from which the instructions 924 can be derived. This format from which the instructions 924 can be derived can include source code, encoded instructions (e.g., in compressed or encrypted form), packaged instructions (e.g., split into multiple packages), or the like. The information representative of the instructions 924 in the machine readable medium 922 can be processed by processing circuitry into the instructions to implement any of the operations discussed herein. For example, deriving the instructions 924 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 924.

In an example, the derivation of the instructions 924 can include assembly, compilation, or interpretation of the information (e.g., by the processing circuitry) to create the instructions 924 from some intermediate or preprocessed format provided by the machine readable medium 922. The information, when provided in multiple parts, can be combined, unpacked, and modified to create the instructions 924. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

Additional Notes & Examples

Example 1 is an apparatus for evicting a cache line with pending control request, the apparatus comprising: an external interface configured to received message from an external entity; a cache including a set of cache lines; and processing circuitry configured to: receive a memory request on the interface of a memory device, the memory request including an address corresponding to the set of cache lines; determine that a cache line of the set of cache lines will be evicted to process the memory request; determine that a control request has been made to a host from the apparatus, the control request pending when it is determined that the cache line will be evicted; increment a counter corresponding to the set of cache lines by one; and evict the cache line.

In Example 2, the subject matter of Example 1, comprising an internal interface configured to receive a second message from an entity of the apparatus, wherein the processing circuitry is configured to: receive, a second memory request on the internal interface, the second memory request including a second address corresponding to the set of cache lines; read the counter to determine that the counter is greater than zero; and push, in response to the counter being greater than zero, the second memory request on a deferred queue for the set of cache lines.

In Example 3, the subject matter of Example 2, wherein the deferred queue corresponds to the internal interface of the memory device.

In Example 4, the subject matter of any of Examples 1-3, wherein the processing circuitry is configured to: receive a response, via the external interface, to the control request from the host, the response indicating that the cache line is under the control of the memory device; resume processing of internal memory requests on the cache line; and decrement the counter by one in response to resuming processing of the internal memory requests.

In Example 5, the subject matter of any of Examples 1-4, comprising an internal interface configured to receive a second message from an entity of the apparatus, wherein the processing circuitry is configured to: receive an internal memory request on the internal interface, the internal memory request including an address corresponding to a cache line that is under control of the host when the internal memory request is received; push the internal memory request onto a queue of pending internal memory requests corresponding to the cache line; and transmit, via the external interface, the control request to the host to gain control of the cache line from the host.

In Example 6, the subject matter of Example 5, wherein, to evict the cache line, the processing circuitry is configured to copy tag data for the cache line into request information memory corresponding to the address.

In Example 7, the subject matter of Example 6., wherein the tag data includes a pointer to the queue of pending internal memory requests corresponding to the cache line.

In Example 8, the subject matter of any of Examples 1-7, wherein the counter has a maximum value equal to a cardinality of the set of cache lines.

Example 9 is a method for evicting a cache line with pending control request, the method comprising: receiving a memory request on an external interface of a memory device, the memory request including an address corresponding to a set of cache lines; determining that a cache line of the set of cache lines will be evicted to process the memory request; determining that a control request has been made to a host from the memory device, the control request pending when it is determined that the cache line will be evicted; incrementing a counter corresponding to the set of cache lines by one; and evicting the cache line.

In Example 10, the subject matter of Example 9, comprising: receiving a second memory request on an internal interface of the memory device, the second memory request including a second address corresponding to the set of cache lines; reading the counter to determine that the counter is greater than zero; and pushing, in response to the counter being greater than zero, the second memory request on a deferred queue for the set of cache lines.

In Example 11, the subject matter of Example 10, wherein the deferred queue corresponds to the internal interface of the memory device.

In Example 12, the subject matter of any of Examples 9-11, comprising: receiving a response to the control request from the host, the response indicating that the cache line is under the control of the memory device; resuming processing of internal memory requests on the cache line; and decrementing the counter by one in response to resuming processing of the internal memory requests.

In Example 13, the subject matter of any of Examples 9-12, comprising: receiving an internal memory request on an internal interface of the memory device, the internal memory request including an address corresponding to a cache line that is under control of the host when the internal memory request is received; pushing the internal memory request onto a queue of pending internal memory requests corresponding to the cache line; and transmitting the control request to the host to gain control of the cache line from the host.

In Example 14, the subject matter of Example 13, wherein evicting the cache line includes copying tag data for the cache line into request information memory corresponding to the address.

In Example 15, the subject matter of Example 14., wherein the tag data includes a pointer to the queue of pending internal memory requests corresponding to the cache line.

In Example 16, the subject matter of any of Examples 9-15, wherein the counter has a maximum value equal to a cardinality of the set of cache lines.

Example 17 is a machine readable medium including instructions for evicting a cache line with pending control request, the instructions, when executed by processing circuitry, cause the processing circuitry to perform operations comprising: receiving a memory request on an external interface of a memory device, the memory request including an address corresponding to a set of cache lines; determining that a cache line of the set of cache lines will be evicted to process the memory request; determining that a control request has been made to a host from the memory device, the control request pending when it is determined that the cache line will be evicted; incrementing a counter corresponding to the set of cache lines by one; and evicting the cache line.

In Example 18, the subject matter of Example 17, wherein the operations comprise: receiving a second memory request on an internal interface of the memory device, the second memory request including a second address corresponding to the set of cache lines; reading the counter to determine that the counter is greater than zero; and pushing, in response to the counter being greater than zero, the second memory request on a deferred queue for the set of cache lines.

In Example 19, the subject matter of Example 18, wherein the deferred queue corresponds to the internal interface of the memory device.

In Example 20, the subject matter of any of Examples 17-19, wherein the operations comprise: receiving a response to the control request from the host, the response indicating that the cache line is under the control of the memory device; resuming processing of internal memory requests on the cache line; and decrementing the counter by one in response to resuming processing of the internal memory requests.

In Example 21, the subject matter of any of Examples 17-20, wherein the operations comprise: receiving an internal memory request on an internal interface of the memory device, the internal memory request including an address corresponding to a cache line that is under control of the host when the internal memory request is received; pushing the internal memory request onto a queue of pending internal memory requests corresponding to the cache line; and transmitting the control request to the host to gain control of the cache line from the host.

In Example 22, the subject matter of Example 21, wherein evicting the cache line includes copying tag data for the cache line into request information memory corresponding to the address.

In Example 23, the subject matter of Example 22., wherein the tag data includes a pointer to the queue of pending internal memory requests corresponding to the cache line.

In Example 24, the subject matter of any of Examples 17-23, wherein the counter has a maximum value equal to a cardinality of the set of cache lines.

Example 25 is a system for evicting a cache line with pending control request, the system comprising: means for receiving a memory request on an external interface of a memory device, the memory request including an address corresponding to a set of cache lines; means for determining that a cache line of the set of cache lines will be evicted to process the memory request; means for determining that a control request has been made to a host from the memory device, the control request pending when it is determined that the cache line will be evicted; means for incrementing a counter corresponding to the set of cache lines by one; and means for evicting the cache line.

In Example 26, the subject matter of Example 25, comprising: means for receiving a second memory request on an internal interface of the memory device, the second memory request including a second address corresponding to the set of cache lines; means for reading the counter to determine that the counter is greater than zero; and means for pushing, in response to the counter being greater than zero, the second memory request on a deferred queue for the set of cache lines.

In Example 27, the subject matter of Example 26, wherein the deferred queue corresponds to the internal interface of the memory device.

In Example 28, the subject matter of any of Examples 25-27, comprising: means for receiving a response to the control request from the host, the response indicating that the cache line is under the control of the memory device; means for resuming processing of internal memory requests on the cache line; and means for decrementing the counter by one in response to resuming processing of the internal memory requests.

In Example 29, the subject matter of any of Examples 25-28, comprising: means for receiving an internal memory request on an internal interface of the memory device, the internal memory request including an address corresponding to a cache line that is under control of the host when the internal memory request is received; means for pushing the internal memory request onto a queue of pending internal memory requests corresponding to the cache line; and means for transmitting the control request to the host to gain control of the cache line from the host.

In Example 30, the subject matter of Example 29, wherein the means for evicting the cache line include means for copying tag data for the cache line into request information memory corresponding to the address.

In Example 31, the subject matter of Example 30, wherein the tag data includes a pointer to the queue of pending internal memory requests corresponding to the cache line.

In Example 32, the subject matter of any of Examples 25-31, wherein the counter has a maximum value equal to a cardinality of the set of cache lines.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus comprising:
   a memory configured to maintain a counter of recall requests, a recall request being a request to a host for a memory device to control a cache line of the memory device, the memory device including the apparatus; and
   processing circuitry configured to:
      receive a memory request from a component of the memory device for the cache line;
      evaluate the counter in response to receipt of the memory request to determine that the counter is greater than zero; and
      push, in response to the counter being greater than zero, the memory request onto a deferred queue that corresponds to a set of cache lines that includes the cache line.

2. The apparatus of claim 1, comprising:
   an external interface to communicate with the host; and
   an internal interface to communicate with components of the memory device.

3. The apparatus of claim 2, wherein memory request is received via the internal interface, and wherein the processing circuitry is configured to evaluate the counter to determine whether to push a request onto the deferred queue only when the request is received via the internal interface.

4. The apparatus of claim 2, wherein the deferred queue is exclusive to the internal interface, and wherein the memory device includes an external deferred queue that is exclusive to the external interface.

5. The apparatus of claim 4, wherein the deferred queue and the external deferred queue correspond to a cache set of the cache line, and wherein other internal deferred queues and external deferred queues are maintained that correspond to other cache sets of the memory device.

6. The apparatus of claim 2, wherein the external interface conforms to a Compute Express Link (CXL) family of standards.

7. The apparatus of claim 1, wherein the processing circuitry is configured to increment the counter for each recall request made to the host by the memory device, a recall request being a request from the memory device for cache line control of a given cache line to switch from the host to the memory device.

8. The apparatus of claim 7, wherein the processing circuitry is configured to decrement the counter for each recall that is returned from the host, a returned recall being a transfer of control of a given cache line from the host to the memory device made in response to a corresponding recall request.

9. The apparatus of claim 1, wherein the component of the memory device is atomic processing circuitry.

10. The apparatus of claim 9, wherein the memory request is part of an atomic memory operation.

11. A method comprising:
maintaining, at a controller of a memory device, a counter of recall requests, a recall request being a request to a host for the memory device to control a cache line of the memory device;
receiving, by the controller, a memory request from a component of the memory device for the cache line;
evaluating the counter in response to receipt of the memory request to determine that the counter is greater than zero; and
pushing, in response to the counter being greater than zero, the memory request onto a deferred queue that corresponds to a set of cache lines that includes the cache line.

12. The method of claim 11, wherein the controller includes an external interface to communicate with the host and an internal interface to communicate with components of the memory device.

13. The method of claim 12, wherein memory request is received via the internal interface, and wherein the counter is evaluated for determining whether to push a request onto the deferred queue only when the request is received via the internal interface.

14. The method of claim 12, wherein the deferred queue is exclusive to the internal interface, and wherein the memory device includes an external deferred queue that is exclusive to the external interface.

15. The method of claim 14, wherein the deferred queue and the external deferred queue correspond to a cache set of the cache line, and wherein other internal deferred queues and external deferred queues are maintained that correspond to other cache sets of the memory device.

16. The method of claim 12, wherein the external interface conforms to a Compute Express Link (CXL) family of standards.

17. The method of claim 11, comprising incrementing the counter for each recall request made to the host by the controller, a recall request being a request from the controller for cache line control of a given cache line to switch from the host to the controller.

18. The method of claim 17, comprising decrementing the counter for each recall that is returned from the host, a returned recall being a transfer of control of a given cache line from the host to the controller made in response to a corresponding recall request.

19. The method of claim 11, wherein the component of the memory device is atomic processing circuitry.

20. The method of claim 19, wherein the memory request is part of an atomic memory operation.

* * * * *